G. C. LAMBERT.
TRACTION RING FOR PNEUMATIC AND OTHER CUSHION TIRED WHEELS.
APPLICATION FILED FEB. 9, 1918.
1,323,193.
Patented Nov. 25, 1919.
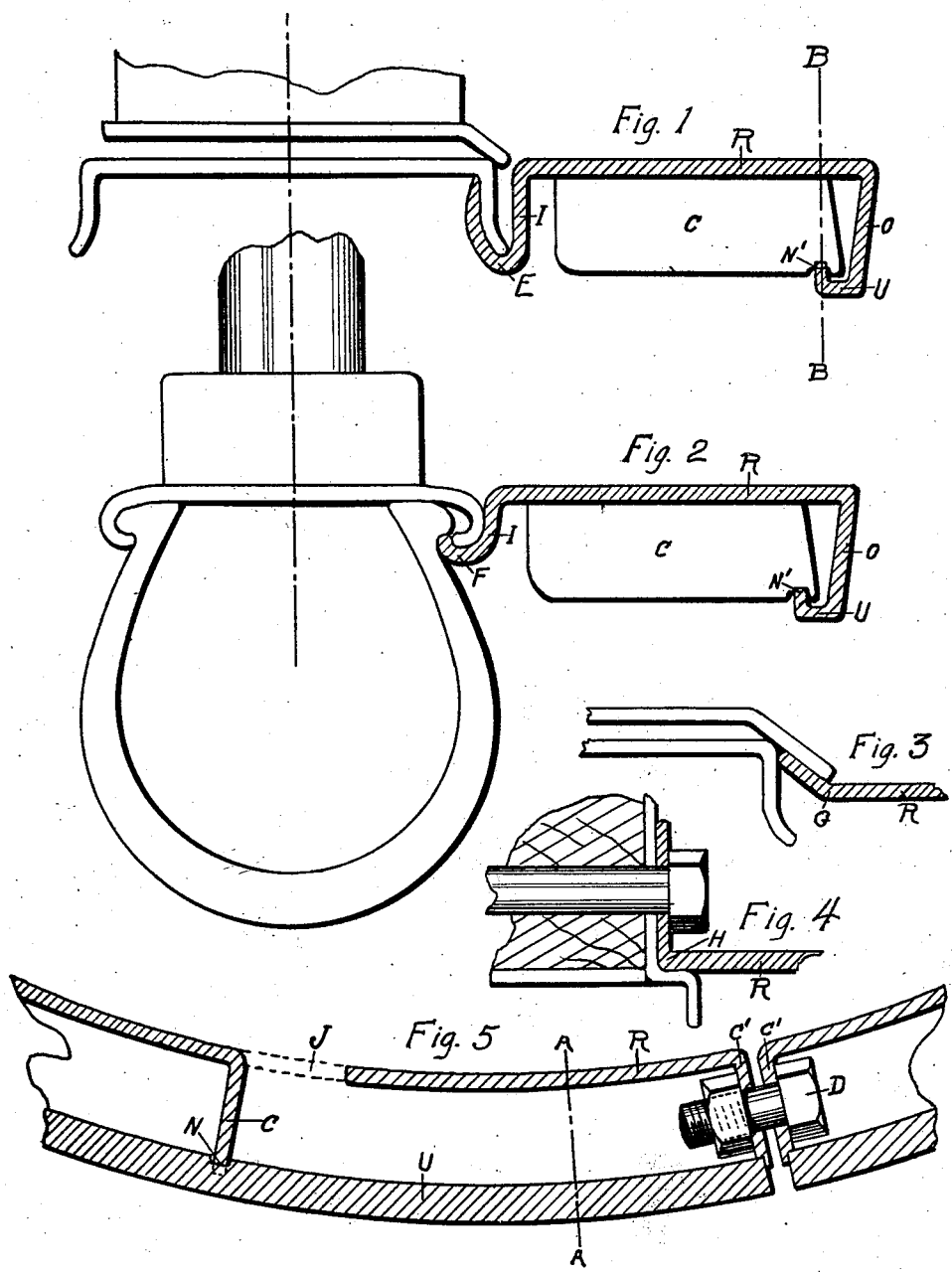
Witnesses
Inventor
George C. Lambert

UNITED STATES PATENT OFFICE.

GEORGE C. LAMBERT, OF ST. PAUL, MINNESOTA.

TRACTION-RING FOR PNEUMATIC AND OTHER CUSHION TIRED WHEELS.

1,323,193.  Specification of Letters Patent.  Patented Nov. 25, 1919.

Application filed February 9, 1918. Serial No. 216,164.

*To all whom it may concern:*

Be it known that I, GEORGE C. LAMBERT, a citizen of the United States, residing at St. Paul, in the county of Ramsey and State of Minnesota, have invented a new and useful Traction-Ring for Pneumatic and other Cushion Tired Wheels, of which the following is a specification.

This invention relates to an auxiliary traction ring to be attached to the wheel of a motor driven vehicle; and the objects of this invention are first, to supply such vehicles with additional traction power when required; second, to provide additional tire and traction surface to the wheels, and an adtional support to the vehicle in soft ground, deep ruts or snow; and third, to bring these auxiliaries into play automatically whenever needed, and to stop their action and wear in the same manner when their use is no longer required.

I attain these ends in a metal traction ring attached to the wheel and consisting mainly of an annular flanged rim provided with raised traction cleats normally held above the ground, and in the features of construction, combination, and arrangement of parts, hereinafter described and claimed.

In the accompanying drawings, forming part of this specification, Figure 1 is a vertical section across the periphery of the traction ring, on line A A (Fig. 5), showing its rim and flanges and their relation to the traction cleats, and showing also, for reference, the corresponding parts of the felly, felly band, and tire rim to which the traction ring is attached. Fig. 2 is a vertical section, similar to Fig. 1, showing the means of attaching the traction ring to a tire rim of the clencher type. Fig. 3 is a vertical section, similar to Figs. 1 and 2, showing the means of attaching the traction ring to a felly band where the projecting upturned edge will permit it. Fig. 4 is a vertical section, similar to Figs. 1, 2 and 3, showing the means of attaching the traction ring to a wheel felly by means of the bolts used to secure the tire flange on the wheels of solid rubber tired trucks or other vehicles. Fig. 5 is a vertical section running through a sector of the traction ring on line B B (Fig. 1), showing the rim and its outer flange, the position of the traction cleats, and the method of securing them into place.

Similar letters refer to similar parts throughout the several views.

The annular rim R, the outer flange O, the inner flange I, and the traction cleats C and C', constitute the framework of the traction ring.

The metal rim R is provided with stiffening flanges O and I, and with traction cleats C and C' located at regular intervals on its outer surface. The flanged rim is broken at one point, so as to allow it to slip over its support, and the two ends are provided with cleats or flanges C' which, in closing the rim, are drawn together by means of two bolts D (one of which is shown in Fig. 5).

The outer flange O is turned in at U, and is provided at intervals with notches N into which the cleats, similarly notched (N') are securely locked. This flange is slightly inclined inward.

The inner flange I follows the contour of its support. When attached to a demountable rim (Fig. 1), it takes the shape of a return bend E to engage the flange of the rim. When attached to a clencher rim (Fig. 2), the return bend F is only partly extended so as to leave room for the bead of the tire. When attached to the felly band (Fig. 3), this flange is turned at an angle G to fit the upturned end of the band. When attached to the felly (Fig. 4), this flange is turned up as shown at H and mounted on the bolts securing the tire holding flanges.

The traction cleats C are located at regular intervals on the outer surface of the rim R. They are cut out of the rim on three sides, as shown at J, and bent over on the fourth side as shown in Fig. 5. Each cleat is provided with a notch N' so located that it will engage the corresponding notch N in the return bend U of the outer flange O and hold the cleat securely in a position perpendicular to the rim. In heavy traction rings the cleats may also be made separately and riveted or bolted to the rim. The two end cleats C' are prolongations of the rim (the flanges being cut out), and are upturned and drilled to receive two bolts D as shown in Fig. 5. By means of these bolts the end cleats are drawn together and the rim is closed.

I am aware that, prior to my invention, traction cleats have been used on wheel tires normally in contact with the ground, but

I claim:

1. The combination, in a traction ring, of a flanged annular rim having raised cleats interlocked with its flange, said rim being adapted to be attached to the outer portion of a tired wheel, in a normal position above the ground.

2. A traction ring, comprising, in combination, a rim formed with raised cleats, and with an outer flange directed inwardly, both the flange and the cleats being notched adjacent to their point of contact to form a lock and hold them firmly in position.

3. A traction ring formed with a flange and a cleat, said flange and cleat being engaged, for the purposes specified.

In testimony whereof I affix my signature in presence of two witnesses.

GEORGE C. LAMBERT.

Witnesses:
ARTHUR M. NEWCOMBE,
IRENE M. HOWE.